Feb. 16, 1937.   H. JENETT   2,071,035
METHOD AND DEVICE FOR COATING TEXTILE MATERIAL
Filed June 12, 1934
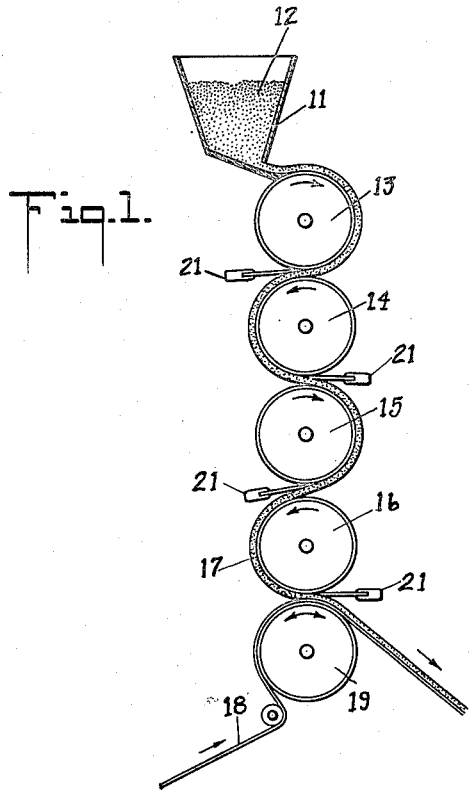
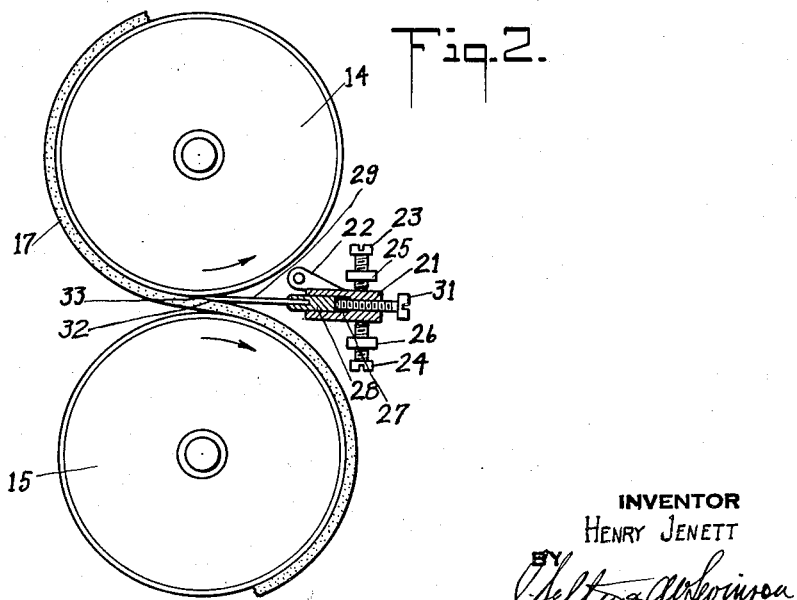
INVENTOR
HENRY JENETT Patented Feb. 16, 1937

2,071,035

UNITED STATES PATENT OFFICE 2,071,035

METHOD AND DEVICE FOR COATING TEXTILE MATERIAL

Henry Jenett, Cumberland, Md., assignor to Celanese Corporation of America, a corporation of Delaware Application June 12, 1934, Serial No. 730,187

11 Claims. (Cl. 154—2)

This invention relates to the method and device for coating fabrics, paper, wood, and similar sheeted materials with a thermoplastic derivative of cellulose or other thermoplastic composition, especially those that have been first reduced to a fine state of subdivision as a molding powder.

An object of the invention is the economic and expeditious production of a sheet or cloth material having thereon or therein a thermoplastic composition and preferably a thermoplastic composition containing organic derivatives of cellulose. Other objects of the invention will appear from the following detailed description.

In the drawing, wherein like numerals refer to the same or like elements:

Fig. 1 is a diagrammatic side view of a fabric coating device showing the position of the doctor blades in reference to the "forming" sheet of plastic material.

Fig. 2 is a detailed side view of a part of the device showing the position and adjusting means for the doctor blades.

Such substances as fabric, paper, wood, composition board, metal, or any porous, flexible or rigid articles may be laminated with all kinds of thermoplastic compositions. Thus, a composition having as a base a cellulose ester or ether, with which there may be incorporated plasticizers, oils, pigments, fillers, etc. which may be reduced to a state of homogeneity either by means and methods described in my application Serial Number 641,233 filed November 4, 1932, now Patent 2,047,967 or by any other method known to the art, may be sheeted by means of calender rolls, or any calender-like equipment and bonded with the article of fabric, paper, etc. by application of heat and pressure.

The natural tendency of such thermoplastic compositions is to stick to the surface of the heated calender rolls unless prevented by a judicious gradation of heat applied, each successive roll being hotter than the one preceding, so that the plastic material being processed to a film or foil passes readily from roll to roll until it reaches the point of contact with the base fabric with which it is to be bonded. The cohesion of the ingredients in the thermoplastic composition also aids in obtaining an even and continuous flow of plastic.

However the gradation of heat from roll to roll and proper cohesion of the ingredients of the plastic compound are not always readily available in practical use, and there results a sticking of the material to the calender rolls. This sticking or winding tendency of the plastic material is overcome by this invention in an economic and expeditious manner other than by accurate control of the heat supplied to the rolls or restricted use of ingredients.

This invention eliminates the necessity of accurate and expensive heat control apparatus. It allows for the use of steam and other heating mediums which are not readily responsive where large volumes of metal are involved, as in heavy calender rolls. This invention also permits of the use of ingredients, such as oils or a very high percentage of filler, say equal to or more parts of filler than base material, which have poor cohesion during the film formation even though in the finished article they are entirely satisfactory.

In accordance with my invention I overcome the tendency of the plastic material passing through a calender from splitting, part clinging to the past roll, or from wrapping itself around one of the rolls, when the conditions are such as to cause such tendencies, by employing doctor blades, which are placed at the point where two rolls diverge and where the plastic sheet or film meets the object with which it is to be bonded. These blades are set up horizontally, or vertically, depending upon the type of calender used, but always substantially parallel with the axis of the roll against which they bear.

The doctor blade may have an unusually long, tapering bevel. It is so set up that the edge points against the direction of travel of the roll on which it bears and the angle at which it meets the roll is determined by the thickness of the plastic sheet it works against. This angle is generally between 95° and 100° from the roll. The angle is measured from an imaginary plane, or line, passing through the axes of two adjacent rolls; therefore the doctor blade generally points at about a tangent toward the point nearest a line through the axes of two adjacent rolls.

The doctor blade may be formed of hard steel, iron or alloy of metals. It is preferably formed of a metal or coated with a metal that does not rust on exposure or tarnish in contact with the plastic material.

Any suitable organic thermoplastic compound may be employed as the sheet forming and coating or impregnating substance, in this invention. For instance I may employ derivatives of cellulose, such as cellulose nitrate or organic derivatives of cellulose. The organic derivatives may be organic esters of cellulose such as cellulose acetate, cellulose formate, cellulose propionate or cellulose butyrate, or cellulose ethers such as ethyl cellulose, methyl cellulose and benzyl cellulose. Thermoplastic compounds other than derivatives of cellulose, such as halogenated rubber, vinyl resins and the like may be employed in this invention.

Any desired modifying agent for the thermoplastic compound may be incorporated therewith. By "modifying agent" I mean any substance which is adapted to impart any desired properties such as softness, elasticity, flexibility, hardness, gloss, color, stability, etc. to the finished product. Such modifying agents may be plasticizers, dyes, pigments, lakes, filling materials, fire retardants, resins, oils, etc.

The choice of plasticizer employed will depend upon the properties of the thermoplastic compound employed. Examples of plasticizers are the aryl sulphonamides as para ethyl toluol sulphonamide, the alkyl phthalates as dimethyl phthalates, the dialkyl tartrates as dibutyl tartrate, the alkoxy esters of polybasic organic acids as diethyoxy ethyl phthalate, the polybasic organic acid esters of the mono-alkyl ethers of polyhydric alcohols, as diethylene glycol ethyl ether ester of phthalic acid, the alkyl esters of phosphoric acid, as triglycol derivatives of phosphoric acid, the aryl esters of phosphoric acid, as tricresyl phosphate, the mixed alkyl and aryl phosphates and camphor. These plasticizers may be employed alone or in combination of two or more and in any suitable quantity. Other suitable plasticizers may be employed alone or in admixture with any of the above, as is fully known in the art.

The thermoplastic material may be formed into a sheet in any suitable manner, then calendered and applied to the fabric or solid article, or a molding powder may be directly calendered to a sheet-like web, both methods being more fully described in applications Ser. Nos. 681,689 filed July 22, 1933 and 718,168 filed March 30, 1934.

In the drawing there is illustrated one form of doctor blade suitable for the process of forming sheets of powdered thermoplastic material and applying such a sheet to a base of fabric or other material. In Fig. 1 there is shown diagrammatically a calender device comprising a hopper 11 for holding and feeding powdered thermoplastic material 12 to a set of calender rolls 13, 14, 15, and 16. The calender rolls are located in suitable adjustable bearings so that the distance between rolls may be accurately adjusted to exert any desired pressure upon the forming web of plastic composition. The calender rolls may also be heated in any suitable manner as by steam, electrical resistance, open flame, or other suitable means. There may be any desired number of calender rolls.

When the web of material is suitably condensed and plastic it may be pressed upon a fabric base material 18 that may or may not be preheated. The pressure between rolls 16 and 19 is so regulated that the plastic material is either coated upon the fabric or pressed into or through the fabric. The composite material may then be drawn from the device, cooled and rolled or cut into suitable form. Additional rolls carrying an embossing design may be added to the calender, so that they would leave their imprint on the hot plastic coming off the calender roll 19.

Between the rolls there may be placed doctor blades 21 which, when of the proper shape and set in the proper position relative to the forming sheet material and rolls, cause the material to feed evenly through the device, prevent rolling of the material on a roll and prevent sticking and bunching of the material. The doctor blades may consist of a body member and blade holder 21 having an ear 22 for supporting the member in a pivotal manner, adjustable by means of the set screws 23 and 24 operating through pivoting arms 25 and 26. The body member 21 is provided with a groove 27 for receiving a blade holder 28 which in turn is fastened to a blade 29. A set screw 31 operating in a threaded hole in the body member 21 is adapted to adjust the forward position of the blade and to hold the blade against the action of the material. The blade may be supported by a single body member 21 at the center or two or more such body members may be spaced along the blade or the body member may extend from side to side of the calender and be braced against the calender frame having one or a plurality of adjusting means coacting therewith. The forward end of the blade is shaped with a long bevel 32 and a relatively sharp edge 33. The bevel is preferably such that it conforms to the desired position of the surface of the forming material and to contact with the material for a sufficient distance to carry said material to the next roll. Modifications from the precise details shown in the drawing may be employed, other means, such as pivoting points for the doctor blade ends and weights or springs for the adjustments of the angle may obviously be made.

The angle at which the blade is set is of importance. If set at an angle much less than 90° the plastic will not be forced onto the diverging roll, but will tend to stow under the blade. If set at an angle far exceeding 100°, the plastic, especially if in the form of a heavy film, will not clear the bevel of the knife and will bunch under it, refusing to pass over to the next roll.

The length and easy taper of the bevel are also very important. A blunt, or short bevel will obstruct the passage of the plastic, even if the angle were right, while a long, tapering bevel will ease it away from one roll to the other.

It is to be understood that the foregoing detailed description and drawing are merely given by way of illustration and many alterations may be made therein without departing from the spirit of my invention.

Having described my invention what I desire to secure by Letters Patent is:

1. Method of forming composite materials, which comprises forming a plastic sheet by passing a thermoplastic material through the nip of a pair of rotating cylindrical surfaces and deflecting said sheet at the nip from one of the rotating surfaces to the other by causing the sheet on emerging from said nip to impinge on a stationary surface, and applying the plastic sheet to a base material.

2. Method of forming composite materials, which comprises forming a plastic sheet by passing a thermoplastic material through the nips formed by a succession of rotating cylindrical surfaces and deflecting said sheet at each nip from one of the rotating surfaces to the next by causing the sheet on emerging from the nip to impinge on a stationary surface, drawing a sheet of base material through the last nip of the series together with the plastic sheet, and at said last nip deflecting the plastic sheet on to the sheet of base material.

3. Method of forming composite materials, which comprises forming a plastic sheet by passing a thermoplastic material through the nips formed by a succession of rotating cylindrical surfaces and deflecting said sheet at each nip from one of the rotating surfaces to the next by causing the sheet on emerging from the nip to impinge on a stationary surface, drawing a sheet of flexible non-thermoplastic base material through the last nip of the series together with the plastic sheet, and at said last nip deflecting the plastic sheet on to the sheet of base material.

4. Method of forming composite materials, which comprises forming a plastic sheet by passing a thermoplastic material comprising an organic derivative of cellulose through the nips formed by a succession of rotating cylindrical surfaces and deflecting said sheet at each nip from one of the rotating surfaces to the next by causing the sheet on emerging from the nip to impinge on a stationary surface, drawing a sheet of flexible non-thermoplastic base material through the last nip of the series together with the plastic sheet, and at said last nip deflecting the plastic sheet on to the sheet of base material.

5. Method of forming composite materials, which comprises forming a plastic sheet by passing a thermoplastic material comprising cellulose acetate through the nips formed by a succession of rotating cylindrical surfaces and deflecting said sheet at each nip from one of the rotating surfaces to the next by causing the sheet on emerging from the nip to impinge on a stationary surface, drawing a sheet of flexible non-thermoplastic base material through the last nip of the series together with the plastic sheet, and at said last nip deflecting the plastic sheet on to the sheet of base material.

6. A multiple roll calender device for forming a plastic web and applying the same to a base material, comprising a pair of heated rolls disposed to form a nip and a blade having its operative edge protruding into the nip of said pair of rolls, said blade being adapted to remove material from one of said rolls and to direct it on to the other of said rolls.

7. A multiple roll calender device for forming a plastic web and applying the same to a base material, comprising a pair of heated rolls disposed to form a nip and a blade positioned at an angle of between 90° and 100° to a plane passing through the axes of said rolls and having its operative edge protruding into the nip of said pair of rolls, said blade being adapted to remove material from one of said rolls and to direct it on to the other of said rolls.

8. A multiple roll calender device for forming a plastic web and applying the same to a base material, comprising a pair of heated rolls disposed to form a nip and a blade having a long tapering bevel thereon and having its operative edge protruding into the nip of said pair of rolls, said blade being adapted to remove material from one of said rolls and to direct it on to the other of said rolls.

9. A multiple roll calender device for forming a plastic web and applying the same to a base material, comprising a pair of heated rolls disposed to form a nip and a blade having a long tapering bevel thereon and having its operative edge protruding into the nip of said pair of rolls at an angle of between 90° and 100° to a plane passing through the axes of said rolls, said blade being adapted to remove material from one of said rolls and to direct it on to the other of said rolls.

10. A multiple roll calender device for forming a plastic sheet and applying the same to a sheet of a base material, comprising a succession of rolls, each forming a nip with the following roll, and at each nip a blade having its operative edge protruding into the nip, said blade being adapted to remove material from one of the rolls at the nip and to direct it on to the other roll.

11. A multiple roll calender device for forming a plastic sheet and applying the same to a sheet of a base material, comprising a succession of rolls, each forming a nip with the following roll, means for heating said rolls, and at each nip a blade having its operative edge protruding into the nip, said blade being adapted to remove material from one of the rolls at the nip and to direct it on to the other roll.

HENRY JENETT.